(12) United States Patent
Rindermann et al.

(10) Patent No.: US 7,692,106 B2
(45) Date of Patent: Apr. 6, 2010

(54) ELECTRONIC SCALE WITH MEMORY SPACE DIVIDED INTO PARAMETER GROUPS

(75) Inventors: Rainer Rindermann, Goettingen (DE);
Jan Von Steuben, Goettingen (DE);
Thomas Pertsch, Goettingen (DE);
Apolonija Kordes, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/209,627

(22) Filed: Sep. 12, 2008

(65) Prior Publication Data
US 2009/0008156 A1    Jan. 8, 2009

Related U.S. Application Data

(63) Continuation of application No. PCT/EP2007/001998, filed on Mar. 8, 2007.

(30) Foreign Application Priority Data
Mar. 15, 2006    (DE) .................. 10 2006 011 791

(51) Int. Cl.
*G01G 19/414* (2006.01)
(52) U.S. Cl. ............... 177/25.13; 177/25.19; 700/305; 702/123; 702/173; 705/416
(58) Field of Classification Search ............ 177/25.13, 177/25.19; 700/305; 702/123, 173; 705/416
See application file for complete search history.

(56) References Cited

U.S. PATENT DOCUMENTS

| | | | | |
|---|---|---|---|---|
| 4,862,401 A | * | 8/1989 | Kubli et al. ................ 708/167 |
| 5,600,781 A | * | 2/1997 | Root et al. ................. 715/745 |
| 6,844,506 B2 | * | 1/2005 | Nuesch et al. ............ 177/25.11 |
| 7,379,537 B2 | * | 5/2008 | Bushey et al. ............ 379/88.01 |
| 2003/0141116 A1 | | 7/2003 | Nuesch et al. | |
| 2009/0071729 A1 | * | 3/2009 | Rindermann et al. ..... 177/25.13 |

FOREIGN PATENT DOCUMENTS

| | | |
|---|---|---|
| DE | 91 07 757 U1 | 9/1991 |
| DE | 100 39 668 A1 | 2/2002 |
| DE | 100 40 744 A1 | 2/2002 |
| WO | 02/14809 A | 2/2002 |

* cited by examiner

*Primary Examiner*—Randy W Gibson
(74) *Attorney, Agent, or Firm*—Sughrue Mion, PLLC

(57) ABSTRACT

An electronic scale having an integrated computer with an input unit for entering selection data, a memory for storing a plurality of parameter values, which can be assigned to function-specific parameters dependent on the entered selection data, a data processing unit for executing weighing applications dependent on a subset of the function-specific parameters and at least one interface for interacting with mechanical and/or electronic components dependent on a subset of function-specific parameters. A plurality of different profiles (24; 24') can be stored as individual parameter value sets to adapt to user-specific and/or application-specific requirements. Selecting a specific profile (24; 24') causes a joint assignment of the values contained therein to the corresponding parameters. The parameters are assigned to a plurality of non-overlapping parameter groups (26, 28, 30), each individual profile (24') only contains those values that can be assigned to the parameters of precisely one parameter group (26, 28, 30), and each parameter group (26, 28, 30) can be assigned the parameter values of at least one profile (24).

14 Claims, 2 Drawing Sheets

ELECTRONIC SCALE WITH MEMORY SPACE DIVIDED INTO PARAMETER GROUPS

This is a Continuation of International Application PCT/EP2007/001998, with an international filing date of Mar. 8, 2007, which was published under PCT Article 21(2) in German, and the disclosure of which is incorporated into this application by reference. This application claims priority and benefit of German patent application 10 2006 011 791.3, filed Mar. 15, 2006. The disclosure of this application is also incorporated herein in its entirety.

FIELD AND BACKGROUND OF THE INVENTION

The invention relates to an electronic scale having an integrated computer, which includes:
- an input unit to enter selection data,
- a memory to store a plurality of parameter values that can be assigned to function-specific parameters dependent on the entered selection data,
- a data processing unit to execute weighing applications dependent on a subset of function-specific parameters, and
- at least one interface to interact with mechanical and/or electronic components dependent on a subset of the function-specific parameters.

A plurality of different profiles can be stored as individual parameter value sets to adapt to user-specific and/or application-specific requirements, such that selecting a specific profile causes the values contained in the profile to be jointly assigned to the corresponding parameters.

Scales of this type are known from German Utility Model 91 07 757 U1.

Electronic scales have an integrated computer that performs various tasks involved in operating the scale. On the one hand it executes the calculations necessary to determine a weighing result. This can, for example, include applying predefined rules to recorded measured values and/or compensation calculations that may be necessary to take account of environmental influences, such as the temperature. Another task of the integrated computer is to define a flowchart depending on the desired application. Modern scales are capable of executing various applications, such as differential weighing, counting, weighing of animals, etc. This often requires a plurality of measured values to be recorded and stored in a predefined sequence and processed according to specific rules. The integrated computer defines such a sequence after an operator has specified the task to be performed. Finally, another task of the integrated computer is to adapt the scale's mechanical and/or electronic components to specific conditions in interaction with hardware components. This involves, for example, ergonomic settings, such as the opening direction of a windscreen, or the interface with external hardware, such as printers, chip card readers, barcode readers or transponder readers, keyboards or the like. The specific way in which the computer is to act depends, among other things, on the applications to be executed, the preferences of the respective users, the conditions at the installation site and the configuration of the scale's peripherals. These dependencies can be defined by means of a plurality of parameters, which must be assigned concrete parameter values in the specific case.

To facilitate this assignment of concrete parameter values it is known to create and store different profiles for different applications and/or users. A profile in this case is a parameter value set or a list of concrete parameter values, which can be activated jointly by accessing a specific profile identifier. This means that all the parameter values stored in the profile are assigned to the corresponding parameters. Each stored profile includes a value for each settable parameter. A correspondingly large amount of memory is required to store a plurality of profiles. This problem is exacerbated if not just one profile is stored for each user of a scale, but each user stores a separate profile for each application the user executes on the scale. This is necessary, however, if the scale is to be convenient to use.

In addition to the problem of the large memory requirement there is the problem of the time-consuming and error-prone creation of these very large profiles. It is known to copy a profile, modify it appropriately and store it under a new identifier. With this method, however, it is easy to transfer and multiply errors in subsequent copies of the profile. With regard to creating the profiles, similar devices are known from German Laid Open Publications DE 100 39 668 A1 and DE 100 40 744 A1. However, these publications fail to address the above-described problems and provide no teaching or suggestion for solving them.

OBJECT OF THE INVENTION

It is an object of the invention to further develop a generic scale by rendering it adaptable to different requirements in an easier, less error-prone and/or less memory intensive manner.

SUMMARY OF THE INVENTION

This object is achieved, in accordance with one formulation, by assigning the parameters to a plurality of non-overlapping parameter groups, each individual profile contains only those values that can be assigned to the parameters of exactly one parameter group and each parameter group can be assigned the parameter values of at least one profile.

This means that the entire set of the parameters is first grouped into subsets and the groups are preferably selected according to the range of action of the parameters contained in the group. An advantageous group classification is, for example, a classification into an application profile, a user profile and a general device setting profile. The parameters assigned to the application profile can, for instance, be parameters that determine the sequence, the display and the computing rules for specific applications, such as counting, differential weighing, weighing of animals, etc. Parameters assigned to the user profile can, for instance, be parameters relating to the ergonomic settings of the scale, such as the opening direction of a door, the assignment of keys, the graphic configuration of a display, etc. Parameters assigned to the general device setting profile can, for instance, be parameters relating to the interaction with a connected peripheral.

The different parameter groups should not overlap, in other words, each parameter is uniquely assigned to a group. This makes it possible to define smaller, group-specific profiles. Such a profile then only contains values that can be assigned to a single parameter group. On the other hand, the invention provides that at least one profile be stored for each parameter group.

The result is that small function-specific profiles with individual identifiers can be stored. Profiles assigned to different parameter groups can be activated independently from each other. "Activating" a profile means assigning the parameter values contained in the profile to the corresponding parameters.

In addition to reducing the memory requirement, the present invention also reduces the likelihood that errors are made when the profiles are created. When creating or modifying a profile, the user is only faced with those parameters that relate to the user's current problem. There is no risk that the user will influence currently unrelated parameters. The present invention also makes it substantially easier to correct a detected error. An individual error, unlike in the prior art, does not need to be corrected in all the stored profiles but rather only in the profiles that correspond to the parameter group affected.

Operating the scale as intended typically requires each parameter group to be actually assigned the values of exactly one profile, that is to say a profile must be activated for each parameter group. It is also conceivable, however, that the classification of the parameter groups is, for example, designed in such a way that certain parameters that are combined in a separate group are not relevant to certain applications. In such a case, the scale could be normally operated even without activating a profile assigned to this parameter group.

As mentioned, it is particularly advantageous if parameters that define the scale's applications are combined in a so-called application parameter group. These are parameters that relate to application-specific information. This can be the selection of specific algorithms, the sequence of process steps of a specific weighing process and/or display requirements for displaying a measurement result.

It has furthermore been found advantageous if, preferably in addition, parameters that define the settings of the mechanical and/or electronic components are also combined, in a so-called setting parameter group. A parameter group of this kind can contain all the interactions with parameters relating to hardware components. If, as provided in a preferred further refinement of the invention, at least one interface is configured as an internal interface to interact with scale-internal mechanical and/or electronic components and, further, as preferably provided alternatively or in addition, at least one interface is configured as an external interface to interact with external peripherals, the setting parameter group can be subdivided. In this particularly preferred embodiment of the invention, parameters that define the settings of the scale-internal mechanical and/or electronic components are combined into a so-called internal setting parameter group and parameters that define the settings of the external peripherals are combined into a so-called external setting parameter group. This corresponds to a classification of the setting parameter group into an internal and external setting parameter group. It has the advantage, among others, that a user who wants to adapt a scale according to the invention ergonomically to his or her special requirements does not run the risk of influencing the interaction of the scale with an external peripheral device that may be installed for logging purposes, for example.

Parameter group-specific access authorizations to modify and/or store profiles can advantageously be issued. This is particularly easy to implement in the context of the present invention because the access authorizations to be issued can be linked to the parameter groups. In contrast, when access authorizations in prior art systems are issued, they must each be linked to the individual parameters, which is time consuming and error-prone.

To further reduce the likelihood of errors being introduced when profiles are created, a preferred further refinement of the invention provides for dialog-based, menu-driven navigation, which offers the user several successive parameter-value input options in creating and modifying profiles. By appropriate configuration of the menu-driven navigation it is possible to prevent the input of essential parameters from being inadvertently omitted. This can be achieved in particular if the profile created or modified is stored only after the entire menu has been navigated. A further improvement of this invention is achieved if the input option offered depends on a previously entered parameter value. If the menu-driven navigation is configured appropriately, the entry of incompatible parameter values is reliably prevented. Thus the user's input options are limited to prevent such incompatibilities.

It is particularly advantageous if, after a parameter value has been entered, one or more additional parameter values that are derived from the entered parameter value according to predefined rules are set automatically. One example would be entering a parameter that defines the application "counting," which could lead to an automatic entry of a predefined algorithm (e.g., to offset measured values) and the setting of a quantity display instead of a weight display.

BRIEF DESCRIPTION OF THE DRAWINGS

Other features and advantages of the invention will become evident from the special description below and the drawings, in which.

DETAILED DESCRIPTION OF THE PREFERRED EMBODIMENTS

Figure 1:
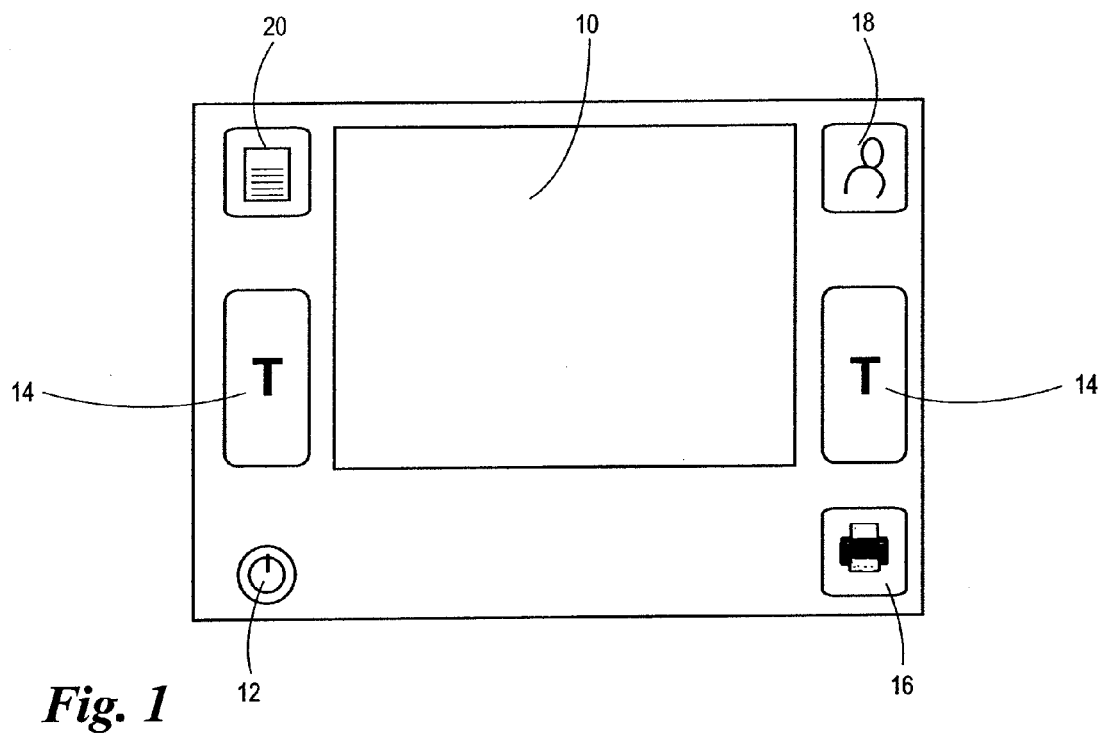
FIG. 1 shows an exemplary user interface of a scale according to the invention.

FIG. 1 shows, by way of example, a user interface of a scale according to the invention. In the center of the user interface is a display 10, which is preferably configured as a touch screen. Areas of the display are context-dependent soft keys, which are known per se. Suitable and known sensors are used to detect touch on a soft key, which is interpreted as a selection of the corresponding function.

In the embodiment shown, several hard keys are provided outside the display 10. In the present embodiment, these are an ON/OFF switch 12, two tare keys 14 to directly actuate the tare function, which is frequently used in scales, and a print key 16 to actuate a print function of a printer, which can be optionally connected to the scale. A user menu key 18 and an application menu key 20 are provided in addition. When the user menu key 18 is pressed, the display shows identifiers of stored parameter value sets called user profiles, which contain values for user-specific, for example ergonomic, parameters and which can be selected and actuated by operating the touch screen, for example. Analogously, when the application menu key 20 is pressed, the display 10 shows a plurality of executable tasks that can be selected and activated by operating the touch screen, for example.

Figure 2:
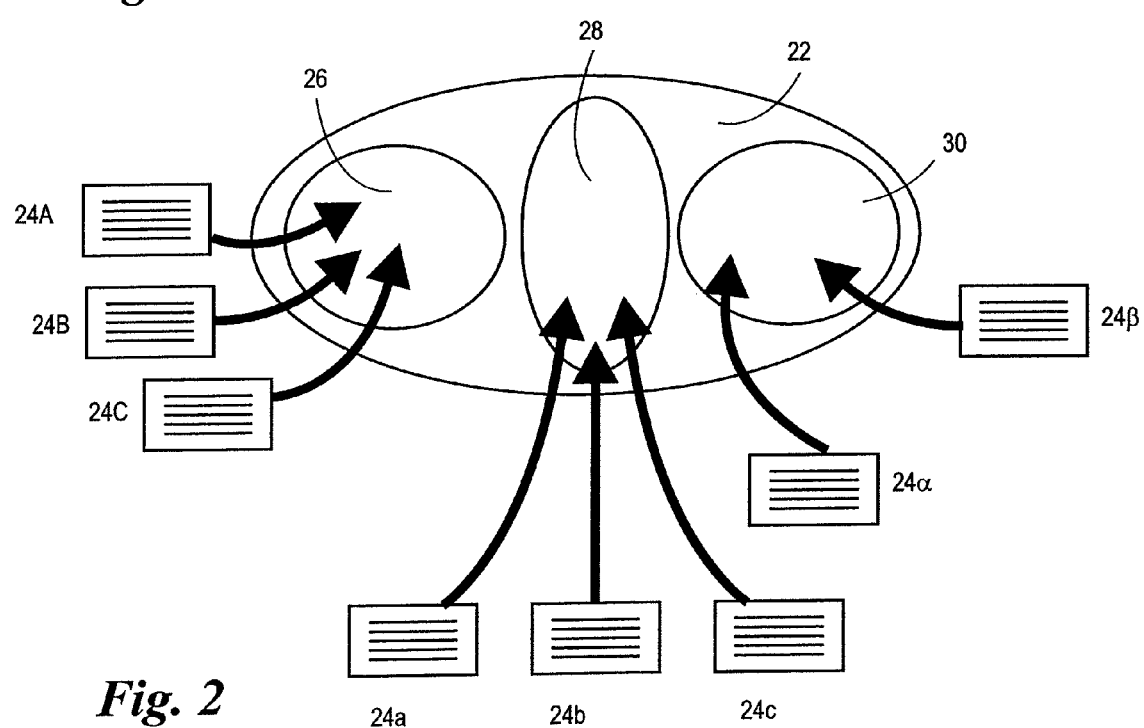
FIG. 2 schematically shows the data structure of the scale according to the invention.
Figure 3:
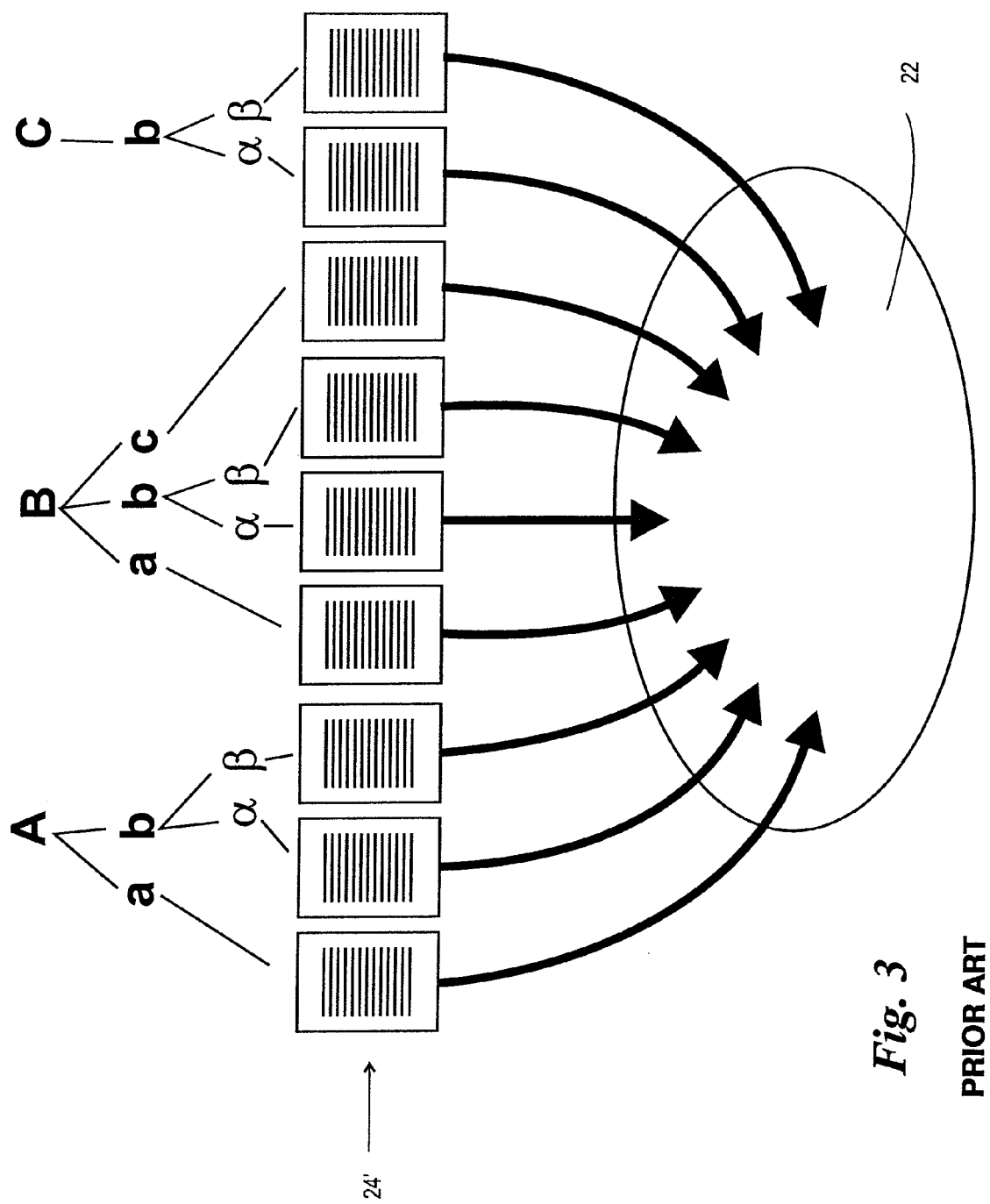
FIG. 3 shows the data structure of a scale according to the prior art.

The nature of the present invention becomes particularly clear in a comparison of FIG. 2 and FIG. 3. FIG. 2 is a schematic representation of the data structure of a scale according to the invention. FIG. 3 shows the conventional data structure of scales of the prior art. The two structures have in common a parameter space 22, which includes all the settable parameters of the scale. Each parameter defines a variable function or property of the scale. To activate a function or property defined by a parameter, the parameter must be assigned a specific parameter value. An example of an ergonomic parameter would for instance be the property of the scale that allows a motor-driven windscreen to be opened toward the right or the left depending on the user's preferences. To activate the property "right" or "left," this parameter must be assigned one of two possible specific values. An example of an application-specific parameter would for instance be the display of the physical unit of a weighing result. Depending on the concrete application, it may be necessary to display a weight (e.g., mg for normal weighing), a quantity (e.g., in counting applications) or a density (e.g., $g/cm^3$ for density measurements). The actual option is enabled by assigning a specific parameter value to the display parameter.

The parameter space 22 contains a large number of these and similar parameters. Profiles can be stored to facilitate the setup of the scale, that is to say the assignment of specific parameter values to all the parameters that are to be set. The differences between the data structure according to the invention and the conventional data structure will be discussed below with reference to the examples illustrated in FIGS. 2 and 3.

Let us assume that the scale is used by three different users A, B and C, who have different references and/or needs. For example, A is a right-hander and has normal vision, B is a left-hander and has normal vision and C is a left-hander who is red-green colorblind. This may mean that A wants a wind screen opening to open toward the right and in addition wants a monochrome display. Let us further assume that the scale is set up in a laboratory where three different weighing applications (a), (b) and (c) are routinely practiced, for example, the weighing of animals, differential weighing and counting. Let us assume, finally, that the differential weighing process can be done using two different protocol conditions .alpha. and .beta. For instance, only a written differential weighing protocol is printed out or digital storage in a connected mass storage device takes place and the samples are identified by means of a connected transponder reader. Based on this, there are 18 different setting options (sum of users).times.(sum of applications).times.(sum of protocol variants)=18. To take each of these variants into account in a data structure according to the art eighteen appropriately modified copies of the profile 24' of an overall parameter value list are required to be stored under individual identifiers. In practice this is inconvenient, however, because it is time-consuming, error-prone and memory intensive. Therefore the creation of profiles 24' will in practice probably be reduced to the variants that are normally used. Let us assume, in the example of FIG. 3, that it has been found in practice that A only performs tasks (a) and (b), the latter in both variants .alpha. and .beta., B performs all the tasks, (a), (b) (in both variants (.alpha. and .beta.)) and (c), and C performs only task (b) in both variants .alpha. and .beta. Therefore nine profiles need to be stored, each of which contains values for each settable parameter.

In contrast, in the data structure according to the invention shown in FIG. 2, the parameter space 22 is divided into three different parameter groups 26, 28, 30. These groups each include function-related parameters and do not overlap. For example, the parameter group 26 might include all user-specific, such as ergonomic, parameters, the parameter group 28 all application-specific parameters and the parameter group 30 the hardware-specific parameters. This grouping makes it possible to store subject-specific profiles, which compared to the prior art need to include substantially fewer entries than the settable parameters contained in the parameter space 22. Rather, user profiles 24A, 24B and 24C only need to include values for the parameters of the user parameter group 26. The application profiles 24a, 24b and 24c only include values for the parameters combined in the application parameter group. The hardware setting profiles $24\alpha$ and $24\beta$ only contain values of the hardware setting parameters combined in the parameter group 30. (The extensions of the reference numeral 24 for the profile stand for the users (A, B, C), the tasks (a, b, c) and the protocol variants ($\alpha, \beta$)).

The selected example requires eight profiles to be stored. The example shown in FIG. 3, which implements objectively the same scenario, requires nine profiles to be stored. Each profile 24 is furthermore substantially smaller than a profile 24' according to FIG. 3. Moreover, all 18 theoretically possible variants can be implemented without creating a new profile. For example, simultaneously activating profiles 24C and 24a makes it possible to cover a situation where user C can execute application (a) using the user settings personally preferred by that user. According to the prior art this would require creating an additional profile 24'.

It is apparent, therefore, that the data structure according to the invention substantially reduces the memory requirement and at the same time increases flexibility. The likelihood of introducing errors when profiles are created is also reduced because only profiles with related subjects, which are consequently easy to follow, need to be created or modified.

A new profile is preferably created using the user interface depicted in FIG. 1. For this purpose, the user is successively given different input options on the screen 10, such that the input of one parameter value limits the selection in a subsequent input step in a meaningful way. Other parameter settings that necessarily result from a previous input can be done automatically, without the need for the user to make a new explicit entry.

The embodiments shown in the figures and explained in the specific, exemplary description are of course only intended as examples of the present invention. In particular, dividing the parameter space 22 into exactly three parameter groups 26, 28, 30 is not obligatory to the invention. More or fewer parameter groups can be realized. The advantageous effects arising from the invention, it is noted, increase with the number of the selected parameter groups. On the other hand, too large a selection of the number of parameter groups can lead to excessive complexity, which has a negative impact on the efficiency of use. The different parameter groups can also be assigned different access hurdles. For example, any user may be authorized to create a user profile, that is to say a parameter value set for parameters of the user parameter group 26, but the creation of a hardware setting profile, i.e., a set of values for parameters of the hardware setting group 30, may be reserved for specially trained personnel. Access privileges can be managed in a manner known per se on the basis of the identification—manual or automatic—of the different users.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. An electronic scale having an integrated computer, comprising:
    an input unit to input selection data,
    a memory to store a plurality of parameter values, which are assigned to function-specific parameters dependent on the selection data entered, a data processing unit to execute weighing applications dependent on a subset of the function-specific parameters, at least one interface to interact with at least one of mechanical and electronic components in accordance with another subset of the function-specific parameters, wherein, in accordance with at least one of user-specific and application-specific requirements, a plurality of different profiles are stored in the memory as respective sets of the parameter values, wherein selection, by a user, of a specific profile from the plurality of profiles causes the parameter values contained in the specific profile to be jointly assigned to the corresponding ones of the function-specific parameters, wherein the function-specific parameters are assigned to a plurality of mutually non-overlapping parameter groups, wherein each respective profile contains only those parameter values which are assigned to the parameters of exactly one parameter group, and wherein each parameter group is assigned the parameter values of at least one profile.

2. A scale as claimed in claim 1, wherein each parameter group is assigned the parameter values of exactly one profile.

3. A scale as claimed in claim 1, wherein parameters that define weighing applications are combined in an application parameter group.

4. A scale as claimed in claim 1, wherein parameters that define settings of the at least one of the mechanical and electronic components are combined in a setting parameter group.

5. A scale as claimed in claim 1, wherein the at least one interface is an external interface to interact with the at least one of mechanical and electronic components of peripherals external to the scale.

6. A scale as claimed in claim 5, wherein parameters that define settings of the external peripherals are combined in an external setting parameter group.

7. A scale as claimed in claim 1, wherein the at least one interface is an internal interface to interact with the at least one of mechanical and electronic components that are internal to the scale.

8. A scale as claimed in claim 7, wherein the parameters that define settings of the at least one of mechanical and electronic components that are internal to the scale are combined in an internal setting parameter group.

9. A scale as claimed in claim 1, wherein the memory further stores parameter group-specific access authorizations for at least one of modifying and storing the profiles.

10. A scale as claimed in claim 1, wherein the memory further stores a dialog-based, menu-driven navigation routine having a plurality of successive parameter-value input options for at least one of generating and modifying the profiles.

11. A scale as claimed in claim 10, wherein a current one of the input options is controlled in accordance with a previously entered parameter value.

12. A scale as claimed in claim 10, wherein, after a parameter value has been entered, at least one additional parameter value is set automatically by the integrated computer in accordance with the entered parameter value according to at least one predefined rule stored in the memory.

13. A method, comprising:
dividing a memory space into a plurality of parameter groups, each group consisting of parameters that are non-overlapping with parameters of remaining ones of the parameter groups, and each parameter defining a variable attribute associated with an electronic scale;

storing a plurality of parameter values respectively for the parameters of each of the plurality of parameter groups as profiles, wherein each of the profiles consists of at least one parameter value of exactly one parameter group;

selecting a subset of the stored profiles, wherein the subset includes a plurality of the profiles and each of the selected profiles corresponds respectively to each of the parameter groups; and operating the electronic scale in accordance with the selected subset of the stored profiles.

14. An electronic scale comprising:
an integrated computer;
an input unit via which a user inputs selection data; and
at least one interface to interact with at least one of mechanical and electronic components associated with at least one weighing application;
wherein:
the integrated computer stores function-specific parameters associated with respective functions of the scale,
the function-specific parameters are grouped into predetermined, mutually exclusive parameter groups, each of the predetermined parameter groups including only such function-specific parameters that are mutually related, and each of the function-specific parameters being grouped into one, and only one, of the predetermined parameter groups,
the integrated computer additionally stores user-generated profiles, each of the profiles containing at least one of user-specific and application-specific parameter values for respective ones of the function-specific parameters, and each of the profiles being restricted to one, and only one, of the predetermined parameter groups,
the integrated computer enables the interface to initiate a respective one of the functions of the scale by activating a plurality of the profiles, as designated by the selection data input by the user via the input unit, the activation being constrained to include no more than one of the profiles from each of the predetermined parameter groups.

* * * * *